Dec. 20, 1966   J. R. CEPON   3,292,404
MANUFACTURE OF BENT TUBES WITH FLARE COUPLINGS
Filed Feb. 26, 1964   2 Sheets-Sheet 1
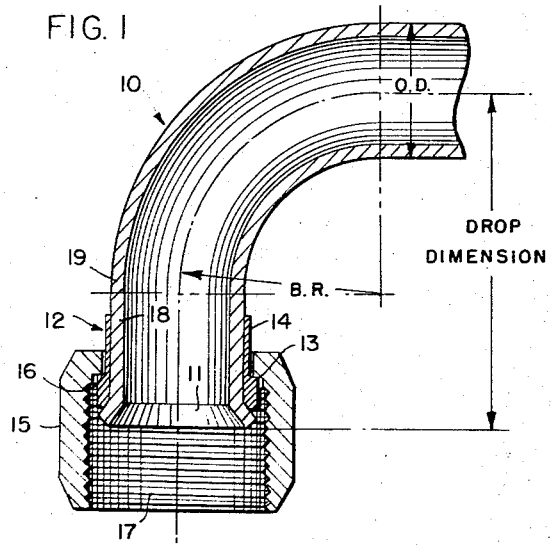
FIG. I
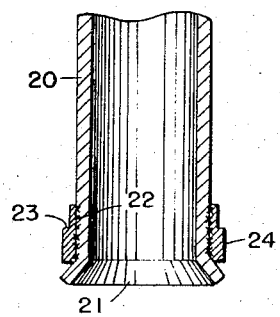
FIG. 2
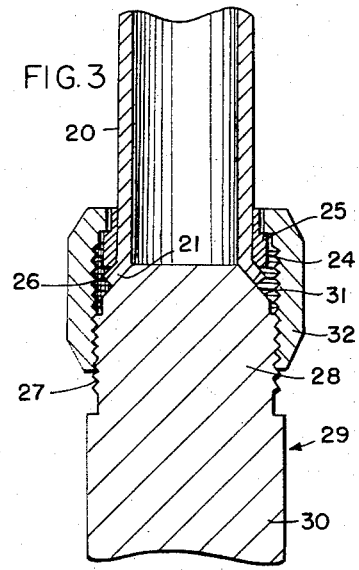
FIG. 3
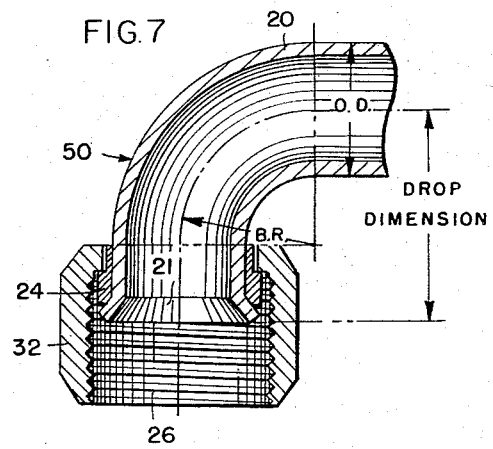
FIG. 7
INVENTOR:—
JOHN R. CEPON
BY:—
Marzall, Johnston, Cook & Root
ATT'YS

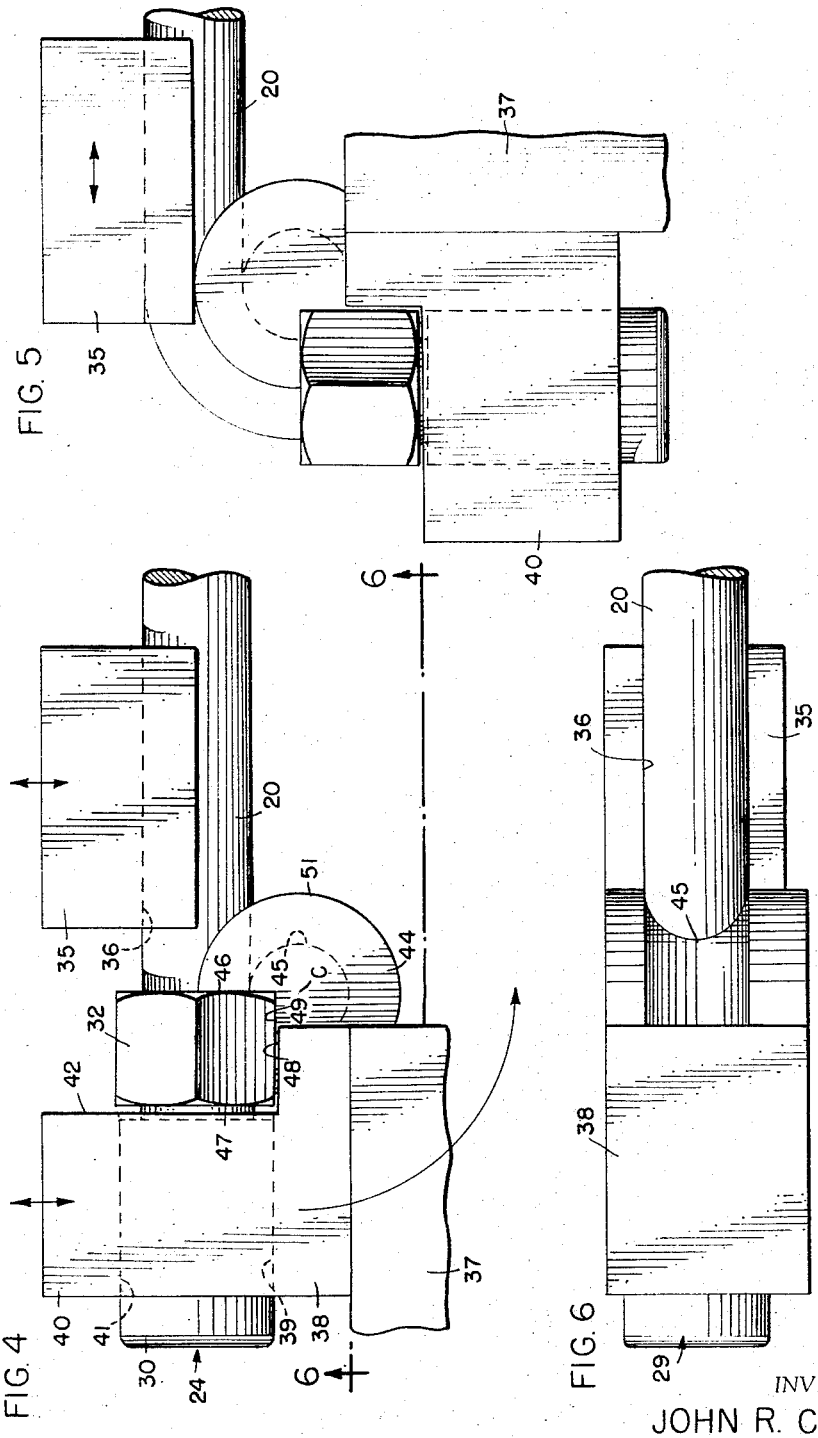

United States Patent Office 3,292,404
Patented Dec. 20, 1966

3,292,404
MANUFACTURE OF BENT TUBES
WITH FLARE COUPLINGS
John R. Cepon, Wadsworth, Ill., assignor to Anchor Coupling Co. Inc., Libertyville, Ill., a corporation of Illinois
Filed Feb. 26, 1964, Ser. No. 347,417
9 Claims. (Cl. 72—150)

The present invention relates, in general, to tube bending and bending devices, and has more particular reference to a process and device for bending tubes closely adjacent the flared attachment nut carrying ends thereof, the invention providing substantially lower drop dimensions and substantially lower ratios of bending radius to tube diameter than have heretofore been possible by conventional manufacturing methods.

The drop dimension of having a bent end is the shortest distance between the center of the tube end and the axis of the unbent tube portion immediately adjacent the bent segment. In a tube having a 90° bend, it is the shortest distance between the plane of the end of the tube and the axis of the tube segment next to the 90° bend. Reduction of the drop dimension has the considerable advantage of shortening the distance between the tube end and the wall of the tube at the termination of the bend farthest from said tube end, thereby minimizing this linear dimension of the unit.

The ratio of the bending radius to the diameter of the tube (B.R.:O.D.) is the ratio of the mean tube bending radius, from the bending center to the axis of the tube to the outside diameter of the tube. Heretofore, in bending tubes adjacent their flared, attachment nut carrying ends, it has not been possible to attain ratios of less than 1.25, without damage to the flared end-attachment nut combination. The present invention enables the attainment of B.R.:O.D. ratios as low as 1.0 without said damage to the combination. The invention, thus, is especially useful in bending tubes at ratios lower than 1.25.

Furthermore, bends made in accordance with known techniques have had to be made with a short, straight portion formed in the tube, between the beginning of the bend and the adjacent face of the tube nut, to avoid damaging the nut carrying tube end. The present invention provides for starting the bend at the face of the nut, without any intervening straight tube portion.

An important object of the invention is to provide a method of and apparatus for bending a metal tube at its attachment nut carrying end, at lower drop dimensions than heretofore successfully attained.

Another important object is to provide processes and devices capable of producing bent tube ends having ratios of bend radius to tube outside diameter that are lower than 1.25 and approach unity.

Still another object is to provide improvements in processes and bending devices capable of providing sharp elbow bends at the bend adjacent the face of the attachment nut of a tube-nut assembly.

A further object is to provide a tube bending device having parts adapted to bend a tube at its nut carrying flared end to provide a bent tube having a minimum drop dimension and minimum B.R.:O.D. ratio.

Yet another object is to provide for bending a tube of the character mentioned by brazing or otherwise securing a nut engaging sleeve to the tube and then bending the tube in a bending device employing a bending plug, a die therefor, a bending radius member, and a pressure plate.

The foregoing and numerous other important objects, advantages, and inherent functions of the invention will become apparent as the same is more fully understood from the following description, which, taken in connection with the accompanying drawings, discloses a preferred embodiment of the invention.

In the drawings:
FIG. 1 is a sectional view through a metal tube-attachment nut assembly known in the prior art and shown for purposes of explaining the improvements afforded by the present invention;
FIG. 2 is a sectional view of the end of a metal tube with a flared end and a metal sleeve mounted thereon;
FIG. 3 is a sectional view showing the metal tube and sleeve of FIG. 2 in combination with an attachment nut and a bending plug;
FIGS. 4 and 5 are views of a bending apparatus with a metal tube-attachment nut assembly therein at the beginning and end of a 90° tube bending operation, respectively;
FIG. 6 is a view of the device as seen from plane 6—6 of FIG. 4; and
FIG. 7 is a sectional view of a bent tube-attachment nut assembly produced by the invention at a minimum drop dimension and a minimum B.R.:O.D. ratio, i.e., about 1.0.

To demonstrate the invention, FIG. 1 of the drawings shows an assembly comprising a bent tube 10 formed with a flared end 11, an attachment nut 15, and a nut seating collar or sleeve 12 on the flared end of the tube, said assembly illustrating common practice prior to my present invention. The tube sleeve 12 is commonly made of metal. It is applied onto the tube prior to the bending thereof, and is loose on the tube. The sleeve 12 has a peripheral shoulder 13 formed on its side wall 14.

The nut 15 has an inner circular shoulder 16 which seats against the shoulder 13 of the sleeve. The tube nut 15 has internal threads 17 for use in coupling the tube 10 to a threaded fitting, stopcock or the like.

Heretofore, it has been found expedient to provide a short, straight portion 18 in the tube 10 between the rear of the nut 15 and the beginning of the bend 19, to accommodate the side wall 14 of the tube sleeve which extends beyond the rear of the tube nut, and also to prevent damage to the flared end of the tube during the bending operation. Tube flare damage was prevented by providing sufficient tube material between the tube flare and the tube bend to make sure that stretching of the tube material during bending will take place in the additional material and not at the tube flare. Unless sufficient tube material is allowed for stretching, the tube flare is apt to be pulled out through the sleeve 12 and nut 15. The drop dimension of the unit shown in FIG. 1 includes this straight length of tubing.

In making the assembly of FIG. 1, the ratio of bending radius (B.R.) to tube outside diameter (O.D.) cannot be reduced below about 1.25 even where there is a minimum straight length of tubing. At lower ratios, flare damage results through the pulling of the flare through the sleeve and nut.

In accordance with this invention, damage to the tube flare can be obviated in providing an assembly of a bent tube, tube sleeve and tube nut of minimum drop dimension and a B.R.:O.D. ratio in the vicinity of 1.0. The fabrication steps involved in the process of the invention begin with the cutting of the tubing 20 to the desired length. The end of the tubing is squared and deburred and the end of the tube 20 is flared to provide a flared end 21 of a predetermined flare angle.

A tube sleeve 24 having on its outer side an annular shoulder 23 is pushed down over the tube 20 until it is seated against the flared end 21. The tube-sleeve-to-tube fit is a close fit, e.g., between a very close slip fit and a light push fit. The tube sleeve 24 is brazed to the tube 20 by brazing material 22, such as silver, copper or other known brazing material, to make the sleeve 24 a united structure on the end of the tube 20.

A tube nut 32 having an inner, annular shoulder 25 adapted to seat against the shoulder 23 is positioned over the sleeve 24 and the flared end of the tube 20 in the manner shown in FIG. 3. The tube nut 32 has internal threads 26 adapted to be threaded with the external threads 27 of the head 28 of a bending plug 29, the latter having a shank 30 projecting outwardly from the flared end of the tube 20 and the nut and sleeve assembly thereon.

The bending plug 29 is threaded in the nut 32 until the bevelled end 31 is seated tightly against the flared end 21 of the tube 20. The unit is now ready for bending of the tube 20 by the procedure hereafter described.

In a tube bending machine or other bending apparatus, a portion of the tube spaced from the nut 32 and on the outer side of the bend to be formed in the tube is held by a pressure die or pressure plate 35. The pressure plate 35 has a longitudinal groove 36 of substantially semicircular cross-section corresponding in radius to the radius of the outer side of the tube 20. The pressure plate or die 35 is movable toward and away from the tube 20 by mechanism well known in the tube bending art for ease in placing the tube and the parts assembled thereon in the tube bending machine as indicated by the arrow shown in FIG. 4.

The bending device or machine further comprises a frame 37, shown in fragment, on which is fixedly mounted a die 38 having a longitudinal groove 39 of semicircular cross-section adapted to receive and hold the cylindrical shank 30 of the bending plug 29. The opposite side of the shank 30 is received and held in a similar, opposing longitudinal groove 41 of semicircular cross-section in the movable die 40. The movable die 40 is movable by means well known in the tube bending art toward and away from the die 38 in the direction of the arrows shown in FIG. 4 so that the bending plug can be inserted in and taken out of the dies 38 and 40. The end of the die 40 which faces the nut 32 is preferably immediately adjacent to the inner face of the nut, such as is shown in FIG. 4 and FIG. 5 for end 42.

A radius block 44, which constitutes the tube bending part of the machine or device, is fixedly attached at an axial end of the die 38 to the frame 37 and/or die 38. The radius block has a circular periphery with a peripheral groove 45 of semicircular cross-section therein. The radius of the semicircular cross-section corresponds to the radius of the outer side of the tube 20.

The radius block 44 has a face 46 lying in a radial plane through the radial center of a circular periphery of the block 44 extending from the peripheral edge toward the radial center. The face 46 is adapted to be positioned immediately adjacent the outer end of the nut 32 so that the peripheral groove 45 begins substantially at the outer face or end of the nut 32.

A circular periphery 51 and the groove 45 therein may, if desired, embrace an angle of more than 180°. The die 38 has a notch in the axial end thereof adjacent the radius block 44, the notch being formed by the wall 47 parallel to but spaced from the face 46 and an intersecting wall 48 at right angles thereto. The radius block may also be notched, the notch being formed by the face 46 and a wall 49 at right angles thereto and lying in the plane of the wall 48. This structure forms a seat on three sides of the nut 32 having a relatively close fit therewith. This structure is of material benefit in avoiding damage to the flared end 21 of tube 20 during the bending operation.

The frame 37, die 38, die 40 and radius block 44 are all pivoted together about the axis C, which is the radial center for the circular periphery 51 and the groove 45 of the radius block 44. The mechanism for this pivotal movement is also a well known in the tube bending art and need not be illustrated. When the aforesaid unit is pivoted through a 90° arc relative to the pressure plate or die 35 (to the position shown in FIG. 5), the tube is caused to form a 90° bend with the inner radius conforming to the bottom of the groove 45. The pressure plate or die 35 is mounted by mechanism so that it can move laterally in the direction of the arrow shown in FIG. 5 with the tube 20 as it is being bent.

The resulting unit of the foregoing operation is the bent tube assembly 50 shown in FIG. 7. This unit 50 has a minimum drop dimension by virtue of elimination of the straight tube segment heretofore employed (see FIG. 1). Also, the B.R.:O.D. ratio is a minimum ratio, i.e., a ratio of about 1.0.

The processes herein disclosed are, thus, capable of providing an assembly of a tube nut on a bent tube with a minimum drop dimension by the steps of flaring an end 21 of a metal tube 20, fitting a metal sleeve 24 about said end of said tube with its inner, axial end seated against the flared end of the tube. The sleeve is fixedly secured to said end of said tube, e.g., by brazing 22. The tube nut 32 with female threads 26 is placed over said end of the tube and said sleeve with its inner, annular shoulder 25 seated on the outer, annular shoulder 23 of the sleeve. The outer, axial end of the sleeve is substantially flush with the corresponding end of the nut 32.

The bending plug with external threads 27 is threaded into the tube nut until the inserted end of the plug has its bevelled edge 31 tightened against the flared end 21 of the tube 20. The die 38 is seated against the plug shank 30 on the side of the tube-sleeve-nut plug assembly corresponding to the side in which the inner radius of the bend in the tube is to be formed. The radius block 44 is matingly seated against about half of the tube on the side corresponding to said side at which said inner radius of bend is to be formed. The axial edge of the groove 45 bears against the tube 20 in a plane substantially flush with the outer end of the tube nut 32. With the pressure plate 35 having its longitudinal groove 36 placed matingly against the tube in the vicinity of the tube nut and on the side of the tube diametrically opposite to the side against which bears the groove 45 in the radius block 44, the tube 20 is bent around radius block with the bend beginning at a point substantially even with the outer face of the tube nut to form the bend in the tube of minimum drop dimension.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A process for forming an assembly of a tube nut on a bent tube with a minimum drop dimension which comprises flaring an end of a metal tube, fitting a metal sleeve about said end of said tube with its inner, axial end seated against the flared end of said tube, brazing said sleeve on said end of said tube, placing a tube nut with female threads over said end and said sleeve and seating an inner, annular shoulder of said tube nut on an outer annular shoulder of said sleeve with the outer, axial end of said sleeve substantially flush with the corresponding end of said nut, threading a bending plug with external threads into said tube nut until the inserted end of said plug is tightened against the flared end of said tube, seating a die against said plug on the side of the tube-sleeve-nut-plug assembly corresponding to the side in which the inner radius of bend in said tube is to be formed, matingly seating a radius block against about half of said tube on the side corresponding to said side at which said inner radius of bend is to be formed, said radius block having a circular groove of substantially semicircular cross-section, the radius of said cross-section corresponding to the radius of the outer side of said tube, an axial edge of said groove bearing against said tube in a plane substantially flush with the outer end of said tube nut, placing a pressure plate with a mating longitudinal groove against the said tube in the vicinity of said tube nut and on the side of said tube diametrically opposite to said side against which bears said groove of said radius block, and bending said tube around said radius block with the bend beginning at a point substantially even with the outer face of said tube nut to form a bend in said tube.

2. In a process as claimed in claim 1, seating the inner face and a side of said nut in at least approximate abutment with the walls of a right angle notch in said die, and applying the bending force to said tube by a second die matingly seated about the side of said plug opposite said side which is seated in said first-mentioned die, both of said dies being rotated about the bending axis for the tube bend in performing said bending of said tube.

3. A process as claimed in claim 2 wherein an axial end of said second die at least approximately abuts the inner face of said nut during said bending operation.

4. A bending device for bending a workpiece assembly of a metal tube having a straight end segment and an outwardly flared end, a metal sleeve fitted about said end segment with the inner, axial end of said sleeve seated against said flared end, means fixedly uniting said sleeve and said end segment of said tube, a tube nut with female threads, an inner, annular shoulder adjacent the axial outer end of said tube nut, and an outer, annular shoulder on the outer, axial end of said sleeve seated against said inner, annular shoulder, said device comprising an externally threaded plug nut adapted to be threaded in said threads of said tube nut with the inserted end of said plug tightened against the flared end of said tube, a die having a longitudinal groove matingly seated against said plug, a radius block with a peripheral, circular groove at an axial end of said die, said groove being of substantially circular cross-section of a radius substantially equal to the radius of the outer side of said tube, said radius block having a face in a radial plane through the radial center of said circular groove, said face adapted to be substantially flush against the outer face of said tube nut, a pressure plate with a longitudinal groove adapted to be matingly seated against said tube in the vicinity of said tube nut and on the side of said tube diametrically opposite to said side against which said groove of said radius block is adapted to bear, and means for exerting on said plug a bending force on said assembly to bend said tube about said groove of said radius block and thereby form a bend of essentially minimum drop dimension.

5. An assembly as claimed in claim 4 wherein said radius block is a block in the shape of a cylinder cut by a nondiametric plane parallel to the axis of said cylinder with the arc of the cylindrical wall being more than 180°, and a shoulder in a plane normal to said last-mentioned plane and intersecting said radial face to form a notch in said radius block in which said tube nut is adapted to be seated.

6. An assembly as claimed in claim 4 wherein said die has intersecting, planar walls forming a right angular notch in an axial end thereof, the axial inner end of said nut and a side of said nut adapted to be seated in said notch.

7. An assembly as claimed in claim 6 wherein said means for exerting a bending force is a pressure die having a longitudinal groove matingly seated about said plug opposite said first-mentioned die with an axial end of said pressure die adapted to be in approximate abutment against the inner side of said nut.

8. A tube bending device for bending a tube nut mounted on one end thereof, said device comprising a frame pivotable about a pivot axis, a die fixedly mounted on said frame, a bending plug having a shank with threads on one end thereof adapted to be threaded in said nut, said die having a longitudinal groove receiving the shank of said bending plug, a radius block fixedly mounted on said frame at an axial end of said die, said radius block having a circular edge with a peripheral groove of substantially semicircular cross-section, the radial center of said edge being substantially coincident with said pivot axis, the peripheral edge of said radius block being intersected by a face in a radial plane through said radial center, and a notch in said axial end of said die formed by a wall substantially parallel to said face and an intersecting wall normal thereto, said walls of said notch and said face forming a seat for said tube nut.

9. A tube bending device as claimed in claim 8 wherein said radius block is a cylinder cut by a nondiametric plane parallel to the axis of said cylinder, the arc of the cylindrical wall being greater than 180°, and a shoulder on said radius block substantially coplanar with said intersecting wall and extending between the wall of said radius block in said nondiametric plane and said face.

References Cited by the Examiner

UNITED STATES PATENTS

| | | | |
|---|---|---|---|
| 655,259 | 8/1900 | Miller | 72—159 |
| 1,167,538 | 1/1916 | True | 72—159 |
| 3,205,690 | 9/1965 | Roessler | 72—150 |

CHARLES W. LANHAM, *Primary Examiner.*

R. D. GREFE, *Assistant Examiner.*